May 16, 1961 M. RETTINGER 2,984,709

MAGNETIC HEAD CONSTRUCTION

Filed Oct. 1, 1954

INVENTOR.
Michael Rettinger
BY
[signature]
ATTORNEY.

2,984,709

MAGNETIC HEAD CONSTRUCTION

Michael Rettinger, Encino, Calif., assignor to Radio Corporation of America, a corporation of Delaware Filed Oct. 1, 1954, Ser. No. 459,660

12 Claims. (Cl. 179—100.2)

This invention relates to the structure of magnetic recording, reproducing, and erasing heads, and particularly to a magnetic head which reduces pole piece wear to a minimum.

In my co-pending application, Serial No. 310,623, filed September 20, 1952 (now abandoned), there is disclosed and claimed a magnetic head structure using runners or shoes of hard material, such as sapphire, at the ends of the gaps and supplemented, in heads having particularly long gaps, by a central runner or shoe. In my co-pending application, Serial No. 419,233, filed March 29, 1954 (now abandoned), there is disclosed and claimed a magnetic head construction in which a non-magnetic powder of extreme hardness is included in the plastic surrounding the pole pieces of a magnetic head. The present invention relates to a magnetic head structure which has been found to further reduce the wear of the pole pieces while maintaining uniform and straight-line contact between the film or tape and the pole pieces.

The present invention utilizes a material harder than the laminations of the cores, the harder material being a series of interspersed layers of coatings on the laminations, or individual, interspersed laminations of the harder material.

To maintain the necessary bearing between the magnetic head gap and the film, and still reduce wear and provide uniform wear along the gap, the sides of each individual lamination are chromium plated so that a series of hard edges along the length of the gap are presented to the tape or film as it passes over the pole pieces. Hard stainless steel laminations interspersed with the mumetal or Permalloy laminations, of which the core is constructed, also provide a similar result. In this manner, the magnetic tape is maintained flat along the gap as the head wears.

The use of chromium plated heads has been suggested, as evidenced by U.S. Patent No. 2,618,709, of November 18, 1952. However, this patent teaches the use of chromium as a plating over the heads. The use of chromium in this manner spaces the film from the gap and provides an undesirable frequency characteristic which varies with wear of the chromium and resulting approach of the film closer to the core. In the present invention, the film is always the same distance from the gap while the chromium and hard steel laminations reduce the wear on the comparatively soft head laminations.

The principal object of the invention, therefore, is to facilitate the recording, reproduction, and erasing of sound to and from magnetic records.

Another object of the invention is to provide an improved magnetic recording, reproducing, and erasing head construction.

A further object of the invention is to provide an improved magnetic recording, reproducing, and erasing head in which the individual laminations of the head are coated with or are flanked by harder layers of a coating or laminations.

The novel features which are believed to be characteristic of this invention, both as to the manner of its organization and the mode of its operation, will be better understood from the following description when read in conjunction with the accompanying drawings, in which.

Figure 1:
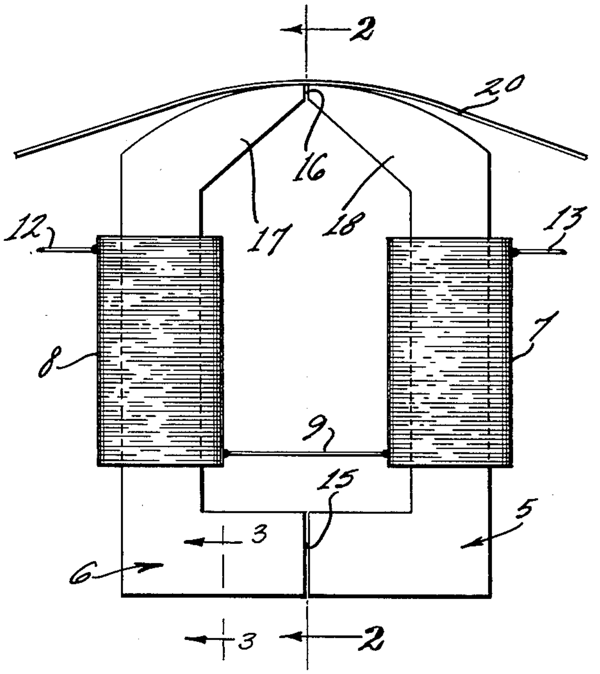
Fig. 1 is an elevational view of a magnetic head embodying the invention.
Figure 2:
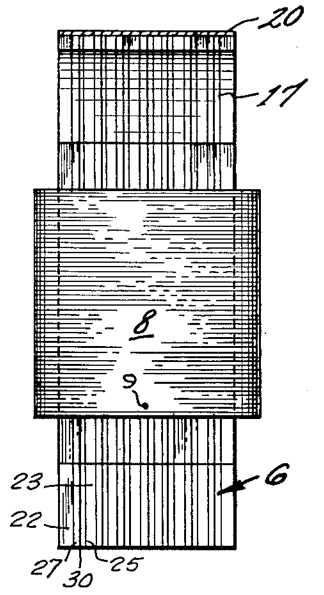
Fig. 2 is a cross-sectional view taken along the line 2—2 of Fig. 1.

Referring now to the drawings in which the same numerals identify like elements, the magnetic head is composed of two core sections 5 and 6 on the legs of which are two coils 7 and 8, respectively, the coils being electrically connected by a conductor 9. The conductors 12 and 13 may be connected to a recording amplifier system when the head is used as a recording head, or to a reproducer amplifier when used as a reproducing head. If used for erasing, the conductors 12 and 13 are connected to a high frequency oscillator.

The core sections 5 and 6 have a rear gap 15 and a front gap 16 between the pole pieces 17 and 18. A magnetic film or tape 20 is shown in contact with the gap 16 and portions of the pole pieces 17 and 18.

Figure 3:
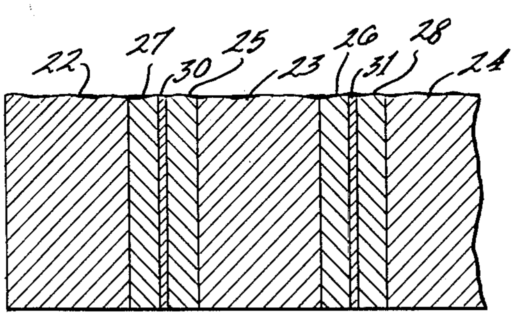
Fig. 3 is an enlarged, cross-sectional, detail view of a portion of the magnetic head shown in Figs. 1 and 2 and taken along the line 3—3 of Fig. 1.

Referring now to Fig. 3, the detail construction of the core sections 5 and 6 is illustrated. The laminations in Fig. 3 are shown at 22, 23, and 24. These laminations may be of mumetal or Permalloy, relatively soft metals. Each lamination is coated on both surfaces with coatings of chromium, lamination 23 being shown with coatings 25 and 26, while only one coating 27 is shown for lamination 22, and one coating 28 being shown for lamination 24. Between the coatings 25—27 and 26—28 are layers 30 and 31, respectively, of thermo-setting cement for holding the laminations in place. With this construction, it will be observed that there will be twice as many hard edges as there are laminations and that the wear will take place uniformly across the length of the gap 16. Since the laminations are approximately .006" in thickness and the chromium plating is approximately .0015", and the layer of thermo-setting cement is approximately .0005" in thickness, there will be no tendency for the film to deleteriously undercut the laminations between the hard edges of the chromium. This construction for reducing head wear always permits the film to bear against the gap and pole pieces on each side thereof at all times during the use of the head.

Instead of the chromium platings 25, 26, 27, and 28, thin, hardened, stainless steel laminations may be positioned on each side of the Permalloy or mumetal laminations to occupy the same position as the chromium plated layers shown in Fig. 3.The above head construction has been found in wear tests to be superior over heads using ferrite cores, heads using hard shoes at the ends of the gap, or heads having an aluminum oxide filler in the plastic.

I claim:

1. A magnetic head construction adapted to have film moved thereover and in contact therewith comprising a plurality of thin magnetic laminations having end terminations, a coating of chromium on at least one side of each of said laminations, said laminations and coatings being aligned in parallel planes in two opposed groups and of configurations to provide a magnetic core with the ends of said laminations of said groups separated from each other to form a gap having a short dimension between the ends of said laminations of the respective said groups and a long dimension transverse of the said laminations, said chromium coatings being thinner and harder than said laminations for reducing the wear of said laminations at said gap caused by the moving of said film thereover.

2. A magnetic head construction adapted to have a film moved thereover and in contact therewith comprising a plurality of comparatively soft magnetic laminations having end terminations, and a layer of harder material than said laminations positioned on at least one side of each of said magnetic laminations, said layers of harder material being thinner than said laminations, said laminations and layers of harder material being arranged in parallel planes in two opposed groups of such configuration as to form a magnetic core, a gap being formed between the ends of said groups of said laminations, the narrow dimension of said gap being between the ends of said groups of said laminations and the longer dimension of said gap being transverse to said laminations.

3. A magnetic head construction in accordance with claim 1 in which said layers of harder material are coatings of chromium.

4. A magnetic head construction in accordance with claim 1 in which said layers of harder material are hardened stainless steel.

5. A magnetic head construction in accordance with claim 1 in which said layers of harder material are held together in said parallel planes by separating layers of thermo-setting cement.

6. A magnetic head construction adapted to have film moved thereover and in contact therewith comprising a plurality of magnetic laminations having end terminations, all of said laminations having the same configuration, and a layer of harder material on each side of each of said magnetic laminations, said laminations being arranged in parallel planes in two groups of a C-shaped configuration, the groups providing a symmetrical magnetic core and the opposing ends of the two groups forming a magnetic gap having a narrower dimension between the ends of said laminations and a longer dimension transverse of said laminations, said layers of harder material being thinner than the layers of said magnetic laminations.

7. A magnetic head construction in accordance with claim 6 in which said layers of harder material are chromium coatings on said magnetic laminations.

8. A magnetic head construction in accordance with claim 6 in which said layers of harder materials are hardened stainless steel.

9. A magnetic head for sound recording and reproducing apparatus for operation with magnetic carriers adapted to slide over said head, comprising, in combination, a plurality of juxtaposed metallic sheets forming a core having oppositely positioned and gap-separated pole pieces comprising the juxtaposed end contact surfaces of said metallic sheets, the two principal surfaces of each of said sheets being on planes perpendicular to the plane of contact between the pole pieces and the magnetic carrier sliding thereover, and a coating of a material having a frictional wear resistance greater than the frictional wear resistance of the metal constituting said sheets, said coating covering at least one of said principal surfaces at least over an area thereof adjacent to and extending up to the said end contact surface constituting the contacting surface between the magnetic head and the magnetic carrier.

10. A magnetic head for sound recording and reproducing apparatus for operation with magnetic carriers adapted to slide over said head, comprising, in combination, a plurality of juxtaposed metallic sheets forming a core having oppositely positioned and gap-separated pole pieces comprising the juxtaposed end contact surfaces of said metallic sheets, the two principal surfaces of each of said sheets being on planes perpendicular to the plane of contact between the pole pieces and the magnetic carrier sliding thereover, and a coating of hard chromium covering at least one of said principal surfaces at least over an area thereof adjacent to and extending up to the said end contact surface constituting the contacting surface between the magnetic head and the magnetic carrier.

11. A magnetic head for sound recording and reproducing apparatus for operation with magnetic carriers adapted to slide over said head, comprising, in combination, a plurality of juxtaposed metallic sheets forming a core having oppositely positioned and gap-separated pole pieces comprising the juxtaposed end contact surfaces of said metallic sheets, the two principal surfaces of each of said sheets being on planes perpendicular to the plane of contact between the pole pieces and the magnetic carrier sliding thereover, and a coating of hard chromium covering both principal surfaces of each of said sheets at least over the area thereof adjacent to and extending up to the said end contact surface constituting the contacting surface between the magnetic head and the magnetic carrier.

12. A magnetic head for sound recording and reproducing apparatus for operation with magnetic carriers adapted to slide over said head, comprising, in combination, a plurality of juxtaposed and spaced metallic sheets forming a core having oppositely positioned and gap-separated pole pieces comprising the juxtaposed end contact surfaces of said metallic sheets, the two principal surfaces of each of said sheets being on planes perpendicular to the plane of contact between the pole pieces and the magnetic carrier sliding thereover, and a coating of a non-magnetic material having a frictional wear resistance greater than the frictional wear resistance of the metal constituting said sheets, said coating covering at least one of said principal surfaces at least over an area thereof adjacent to and extending up to the said end contact surface constituting the contacting surface between the magnetic head and the magnetic carrier, said coating filling the space between adjacent sheets.

References Cited in the file of this patent

UNITED STATES PATENTS

| | | |
|---|---|---|
| 2,361,752 | Eilenberger | Oct. 31, 1944 |
| 2,361,753 | Eilenberger | Oct. 31, 1944 |
| 2,531,642 | Potter | Nov. 28, 1950 |
| 2,615,990 | Blaney | Oct. 28, 1952 |
| 2,618,709 | Eckert et al. | Nov. 18, 1952 |
| 2,711,945 | Kornei | June 28, 1955 |
| 2,850,582 | De Raemy | Sept. 2, 1958 |

FOREIGN PATENTS

| | | |
|---|---|---|
| 691,505 | Great Britain | May 13, 1953 |